United States Patent [19]

Limb

[11] 4,439,763
[45] Mar. 27, 1984

[54] COLLISION AVOIDING SYSTEM AND PROTOCOL FOR A MULTIPLE ACCESS DIGITAL COMMUNICATIONS SYSTEM

[75] Inventor: John O. Limb, Berkeley Heights, N.J.

[73] Assignee: Bell Telephone Laboratories, Incorporated, Murray Hill, N.J.

[21] Appl. No.: 298,954

[22] Filed: Sep. 3, 1981

[51] Int. Cl.³ .......................... H04Q 9/00; H04J 6/02
[52] U.S. Cl. .................................. 340/825.5; 370/85
[58] Field of Search .................... 340/825.5, 825.51; 370/85, 87; 364/200 MS File, 900 MS File; 455/78, 58

[56] References Cited

U.S. PATENT DOCUMENTS 3,851,104 11/1974 Willard et al. .
4,063,220 12/1977 Metcalfe et al. ................. 340/825.5
4,161,786 7/1979 Hopkins et al. ..................... 364/900
4,210,780 7/1980 Hopkins et al. ....................... 370/80

OTHER PUBLICATIONS

*Consiglio Nazionale Delle Ricerche, Progetto Finalizzato Informatica Cnet,* #57, Feb. 1982, Marsan.
*Computer Systems Laboratory,* Stanford Univ., #220, Tobagi, Dec. 1980.
*Proceedings of the International Conference on Performance of Data Communications Systems and Their Applications,* Pujolle, Sep. 14–16, 1981, pp. 77–88.
*Proceedings Computer Network Protocols Symposium,* Morling, Feb. 13–15, 1978, pp. B4-1–B4-6.
*Proceedings of the Local Area Communications Network Symposium,* Hopkins, May 1979, pp. 169–177.
"Local Networks and Distributed Office Systems", Hopkins, pp. 97–105, 1981.
*EEM,* 1980, pp. 3312–3315.

*Primary Examiner*—James J. Groody
*Attorney, Agent, or Firm*—Richard J. Roddy

[57] ABSTRACT

With the advent of digital communications, it is common to transfer packets of information among a plurality of stations, e.g., digital computers. In order to control the transfer of the packets, various protocols have been introduced. However, the efficiency related to known multiples access digital communications system protocols tends to decrease as the digital signal rate increases. To overcome such problems, the instant communications system and protocol contemplate a communications loop having first and second oppositely directed signal paths. At least two stations are coupled to both the first and the second signal paths. A station includes an arrangement for writing a first signal on the first path and an arrangement for reading a second signal from the second path. In addition, the station includes an arrangement for reading a third signal from the first path. The third signal is coupled from the first path to the station by an arrangement which electrically precedes the arrangement for writing the first signal on the first path. If the station has a packet to transmit, it can overwrite a busy control field of the third signal packet on the first path. Having read the third signal on the first path, a logical interpretation may be made within the station as to whether the first path is busy or not busy. If the first path is not busy, the packet may be written on the first path by overwriting the third signal thereon. If the first path is busy, the station may overwrite a request control field of the third signal for indicating that the station was unable to transmit the packet. The packets flow around the loop and are monitored on the second path. Eventually all packets will be transmitted and the request control field may be detected at the receive side of a head station for indicating the event that all packets have been transmitted, in which event a new cycle may be started by initializing each station on the loop and by permitting each station to transmit.

25 Claims, 6 Drawing Figures

COLLISION AVOIDING SYSTEM AND PROTOCOL FOR A MULTIPLE ACCESS DIGITAL COMMUNICATIONS SYSTEM

TECHNICAL FIELD

This invention relates to communications systems and, more particularly, to multiple access digital communications systems, stations and protocols for use therein.

BACKGROUND OF THE INVENTION

In the early days of the telephone art, use of the telephone was often confined to communications among users within a local geographic area. As a result and over the years, the economies related to accessing a communications system have lead to telephones in a local area usually being interconnected through a central controller, often called a local central office in the art.

As digital computers came upon the scene, another local community of use was discernible. Hence, a central controller is commonly employed for interconnecting various user terminals. For example, U.S. Pat. No. 3,851,104; entitled "Digital Communications System" and issued Nov. 26, 1974; discloses a time division, multiple access communications system which, under the control of a central terminal, provides communication links among a plurality of user terminals by way of a single communications signal path.

As the digital computer art advanced, parallel advances in the semiconductor art have lead to smaller, relatively inexpensive computers. With the advent of such smaller computers, the technique of central computer control is being abandoned in favor of a distributed control technique. Also, because of the usually bursty nature of digital information, the recent trend has also been toward communications systems having a capability for handling packets of digital information. One such distributed control communications system is disclosed in U.S. Pat. No. 4,063,220; entitled "Multipoint Data Communication System with Collision Detection" and issued Dec. 13, 1977. Indeed, the '220 patent discloses a communications system in which, when a terminal is to start an intended transmission on a communications path, a phased decoder detects the presence of other transmissions on the path and, responsive thereto, delays the intended transmission until no other transmissions are sensed. Once a transmission has started, if an interference (or collision) therewith is detected, a random number generator is used to select an interval of time at the completion of which the next transmission will take place.

Collisions being a problem, efforts exist in the art toward providing communication protocols for mitigating the deleterious effects of collisions. For example, one solution, called a slotted contention protocol, is disclosed in U.S. Pat. No. 4,161,786, entitled "Digital Bus Communications System" and issued July 17, 1979. Another solution, called an unslotted contention protocol, is disclosed in U.S. Pat. No. 4,210,780, entitled "Multiple Access Digital Communications System" and issued July 1, 1980. Unfortunately, the efficiency related to known multiple access digital communications system protocols tends to decrease as the digital signal bit rate increases, e.g., in a range of about 50-to-200 megabits per second.

SUMMARY OF THE INVENTION

This and other problems are solved in accordance with the principles of the instant invention in which an improved communications system, a station and a protocol for use in a communications system may be used both to avoid collisions on a communications loop and to improve the efficiency of the loop at relatively high digital bit rates. The communications system may include first and second communications signal paths. Each of at least two stations such as a digital computer may be coupled to both the first and the second paths. A station may write a first signal on the first path and read a second signal from the second path. A station may also read a third signal from the first path. The arrangement for reading the third signal may be electrically preceding the arrangement for writing the first signal on the first path. In response to the first, second and third signals, the communications system and its protocol avoid collisions on the communications loop. According to one aspect of the instant invention, collisions may be avoided using a contention mode. According to the contention mode, a busy field of a packet may indicate that the first path is either busy or not busy. If the first path is not busy, the station may write a packet on the first path. If the first path is busy, the station may write a request control field for indicating that the station has a packet to transmit and that it is contending for the first path. According to a second aspect of the instant invention, called a random mode, a station may transmit a plurality of packets. According to a third aspect of the instant invention, called a priority mode, a predetermined priority of transmission may be established among the stations coupled to the communications loop. According to a fourth aspect of the instant invention, called a reverse order mode, the established priority may be reversed.

BRIEF DESCRIPTION OF THE DRAWING

The invention should become fully apparent when taken in connection with the following detailed description and accompanying drawing in which.

DETAILED DESCRIPTION

Figure 1:
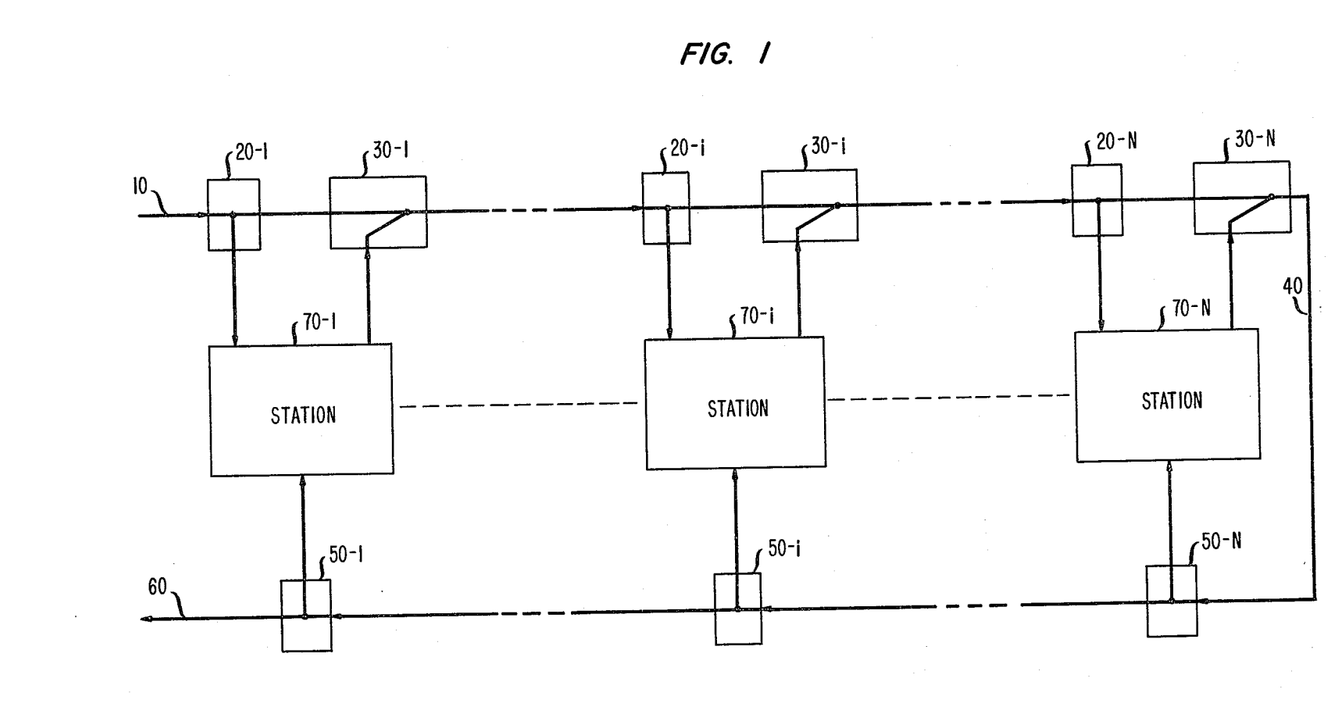
FIG. 1 illustrates an arrangement including a plurality of stations interconnected with a communications loop, which arrangement is useful in describing the principles of the invention.

Referring to the illustrative structure shown in FIG. 1, inbound unidirectional communications signal path 10, also herein called the transmit path, is there illustrated as extended through a plurality of cascaded transmission couplers such as passive read coupler 20-$i$ and passive write coupler 30-$i$. Path 10 then loops around over signal path 40 through another plurality of cascaded transmission couplers such as passive read coupler 50-$i$ by way of outbound unidirectional communications signal path 60, also herein called the receive path. Thus, each of stations 70-$l$ through 70-$N$ is coupled to the communications loop thereby formed, the coupling being both on inbound path 10 and on outbound path 60. In particular, each station such as station 70-$i$ may be coupled to the communications loop by way of three passive couplers. However, unlike the known prior art, two couplers may be employed on inbound transmit, unidirectional path 10 while one coupler may be employed on outbound receive, unidirectional path 60. On inbound path 10, one coupler may be nondirectional read coupler 20-$i$, which electrically precedes a second coupler, the second coupler being directional write coupler 30-$i$. On outbound path 60, a third coupler, e.g., nondirectional read coupler 50-$i$, may be employed.

Still more particularly, on the one hand, nondirectional read couplers 20-$i$ and 50-$i$ are for electrically coupling signals, which are detected on a respective inbound 10 or outbound 60 communications path to station 70-$i$. In that manner, station 70-$i$ may monitor or read signals on both the transmit side and the receive side of the communications loop. On the other hand, directional coupler 30-$i$ is for coupling and inserting or writing a signal from station 70-$i$ onto the transmit side of the communications loop. The inserted signal could, responsive to an inbound signal being priorly read from path 10 through the electrically preceding nondirectional read coupler 20-$i$, overwrite the inbound signal, e.g., by a write signal being electrically added to the signal, if any, already on path 10. In that manner, station 70-$i$ may transmit a signal by causing the signal to be inserted or written on the transmit side of the communications loop.

Advantageously, the structure illustrated in FIG. 1 need not include any electronics on the loop formed by paths 10, 40 and 60. Rather, the loop could include only passive couplers. Thereby, the likelihood of the loop becoming electrically opened is mitigated and its reliability is increased. Alternatively, electronic amplifiers and the like may be included on the loop for amplifying and compensating the loop signals, e.g., in a system with a relatively long electrical loop length. In such a system, responsive to the detection of an electrical open or other failure, one or more stations may be adapted to insert an electrical bridge between the transmit side and the receive side of the loop, thereby forming two or more separate loops to mitigate the deleterious effects of a failure.

Also advantageously, station 70-$i$ may include station terminal equipment such as a digital computer or a starightforward digital interface unit, the interface unit, for example, for interconnecting the loop formed by paths 10, 40 and 60 with one or more other such loops, some of the other loops perhaps being geographically distant from the instant loop. As an aside, it is common in the art that, when the stations are electrically relatively close to each other, e.g., within about two miles of each other, such a loop is referred to as a local communications network or as a local digital loop. Thus, in line with this advantage of the structure illustrated in FIG. 1, a plurality of local networks may be interconnected for forming a still larger communications system.

Before more particularly describing the operation of a system embodying the principles of the instant invention, some ancillary matters are first described.

Figure 2:
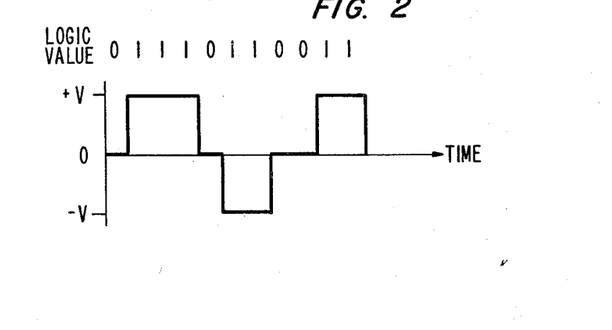
FIG. 2 illustrates a bipolar digital signal useful in describing the principles of the invention.

As to electrical signals on the communications loop, assume for illustration and not by way of limitation a bipolar digital signal of the type illustrated in FIG. 2. Each logic zero is assumed to have a first voltage level potential, e.g., a zero level potential. On the other hand, a logic one or a sequence of consecutive logic ones may be transmitted at a second potential level (e.g., $+V$) until a next logic zero is to be transmitted. The logic zero may be transmitted, as aforedescribed, at the first potential level. After the logic zero or sequence of consecutive logic zeroes is transmitted, a then following logic one or a sequence of consecutive logic ones is transmitted at a third potential level, here the third potential level (e.g., $-V$) is illustratively the inverse of the second potential ($+V$) level. The logic one potential level may continue such alternations after each logic zero or sequence of consecutive logic zeroes.

Figure 3:
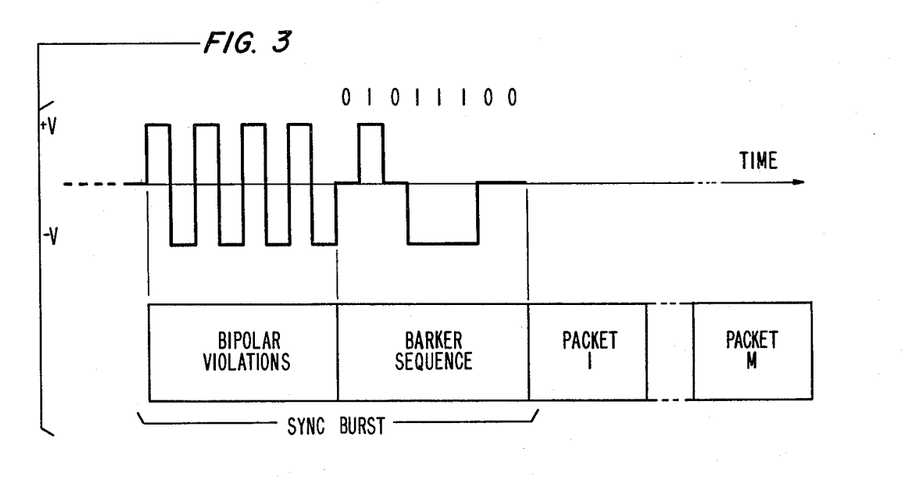
FIG. 3 illustrates a synchronizing signal and digital signal pattern useful in describing the principles of the invention.

As to synchronizing digital signals on the communications loop, assume for illustration and not by way of limitation a synchronizing digital signal sequence such as that illustrated in FIG. 3. The there illustrated synchronizing sequence is hereinafter called a sync burst and may be transmitted by any of the stations on the loop, the sync burst transmitting station being hereinafter referred to as the head station. Here assume for brevity of description that station 70-$l$ is the head station. As an aside, if station 70-$j$ is assumed to be the head station and if for some reason station 70-$j$ fails to operate properly, then station 70-($j$+1) may adaptively become the head station. Hence, there is no central control terminal. Continuing, although other synchronizing sequences could be used, the illustrative sync burst includes a plurality of bipolar violations followed by a predetermined digital sequence. Bipolar violations may include a succession of alternations between the second and the third potential levels with no intervening logic zero. It may be noted that such a sequence of alternations is contrary to the aforedescribed bipolar signal of FIG. 2, hence the term bipolar violation. The bipolar violations may be transmitted from the head station and may be extended through read couplers 20-$i$ and 50-$i$ to synchronizing and timing circuitry of station 70-$i$ for bit synchronizing the station circuitry and the loop digital signals. Following a prefixed number of bipolar violations, the sync burst may further include a predetermined digital sequence such as the Barker sequence "01011100". The Barker sequence may be transmitted from the head station and may also be extended through read couplers 20-$i$ and 50-$i$ to synchronizing the and timing circuitry of station 70-$i$ for data synchronizing station circuitry and the loop digital signals. As a result, each of the plurality of stations of the loop includes a straighforward arrangement for both bit synchronizing and data synchronizing the station in response to the detection of the sync burst of bipolar violations and Barker sequence.

As to inserting a signal from a station, subsequent to the transmission of the sync burst, one or more packets of information, e.g., M packets, may be transmitted on the loop. Indeed, a packet may, for example, be transmitted in a time slot of a time division multiplexed signal. However, absent a control protocol, collisions between the packets could occur. According to the principles of the instant invention, a hereinafter described control protocol may be used for controlling the signals on the loop and for avoiding collisions.

Figure 4:
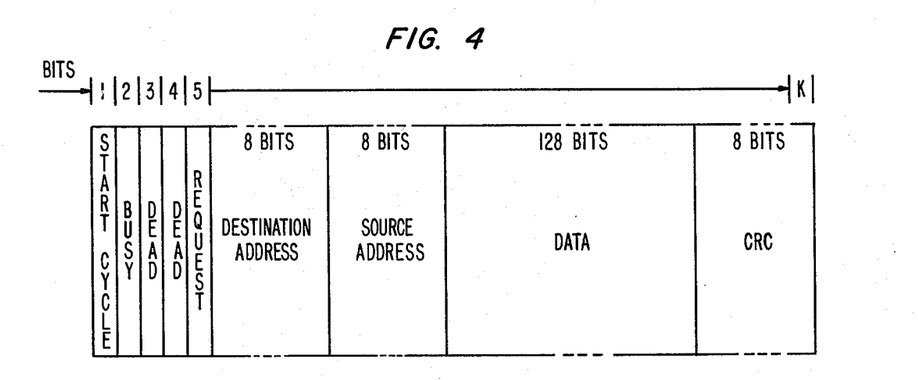
FIG. 4 illustrates a typical packet format useful in describing the principles of the invention.

As to the instant control protocol, FIG. 4 depicts an illustrative packet as comprising K bits, where for illustration and not by way of limitation K is here assumed to equal 157 bits. Also, for illustration, a packet is assumed to include a plurality of control fields, each field including one or more bits. Here, the first five bits of the data packet are labelled start cycle, busy, dead, dead and request, respectively, and may comprise four control fields for the instant protocol, the dead control field including two bits. The packet may, as is common in the art, also include a destination station address field, a source station address field, a data field, and an error control field. Again, each field may include one or more bits. One error control field may also include a well known cyclic redundancy code (CRC). Also, the packet may be read from a written into a time slot of a time division multiplexed signal on the loop.

Now that some ancillary matters have been described, the following description of one aspect of the instant control protocol for avoiding collisions, called a contention mode, focuses on the logical interpretation of the control fields as well as on the logical function of a "permit" register, at least two and perhaps each of the N stations having a permit register.

Firstly, assume, as aforedescribed, that a sync burst has been transmitted for bit and data synchronizing each station. Thereafter, one or more data packets may be transmitted as a time division multiplexed signal. Each data packet is assumed to have the format illustrated in FIG. 4.

Figure 6:
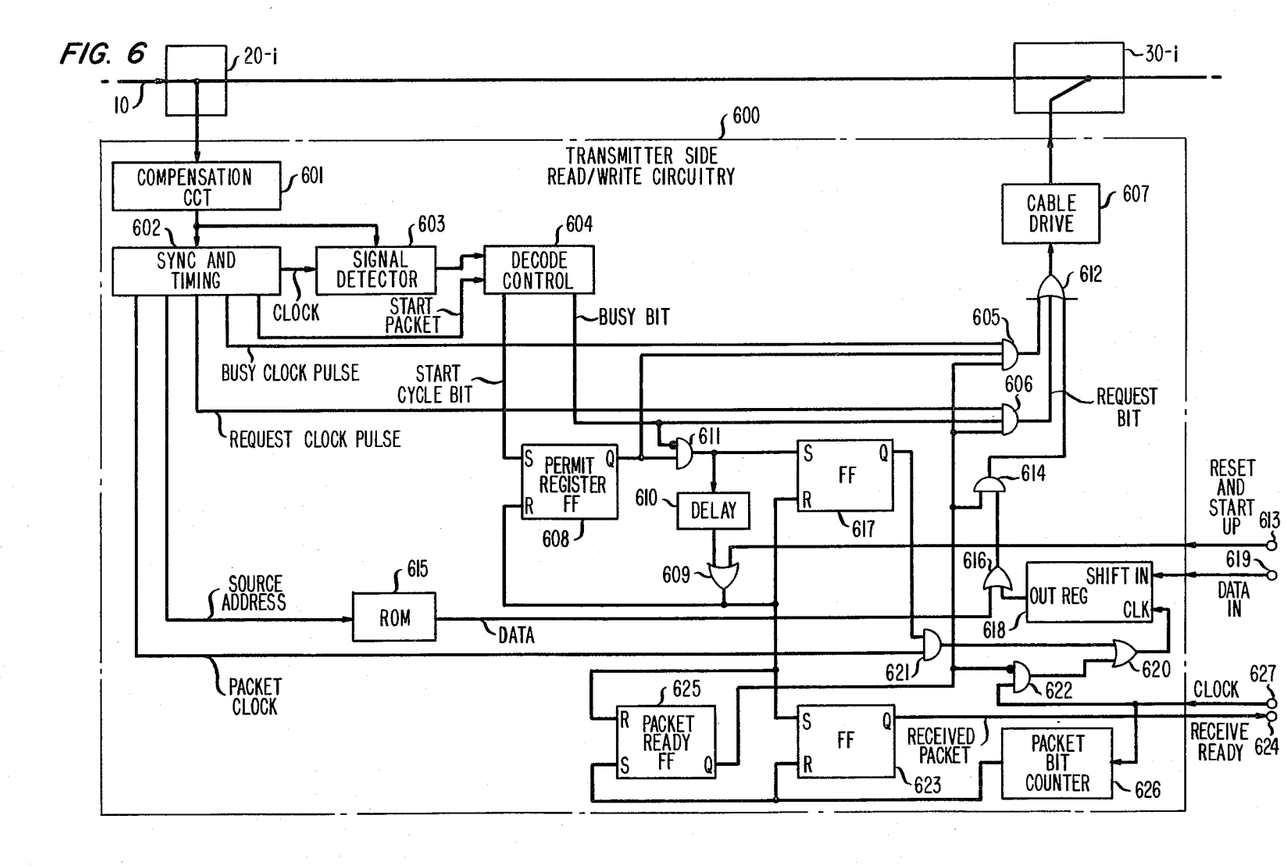
FIG. 6 illustrates transmit side read/write circuitry, which may be included in each station of FIG. 1 and which is useful in describing the principles of the invention.

Secondly, as aforedescribed, read coupler 20-$i$ electrically precedes write coupler 30-$i$ for respectively coupling signals to and from station 70-$i$. Hence, as a packet is extended over path 10, it may be read from path 10 by way of read coupler 20-$i$ and overwritten on path 10 by way of write coupler 30-$i$. In particular, the digital signal on path 10 may be coupled through read coupler 20-$i$ to read circuitry of station 70-$i$ and therein through a logic arrangement for detecting and responding to the protocol control bits. In responding to the control bits, for example, by overwriting the control bits or, for that matter, by overwriting any other field of the packet, write circuitry of station 70-$i$ may cause signals to be extended from station 70-$i$ through write coupler 30-$i$ to path 10. Illustrative transmit side read/write circuitry is shown in FIG. 6.

Thirdly, assume for purposes of illustration and not by way of limitation that each of the N stations on a loop may transmit a single packet during a time frame, which time frame is hereinafter referred to as a cycle. In one embodiment, a cycle may include up to (M=)N packets. That is, there may be M time slots in a cycle. In other embodiments, a cycle may include more or less than N packets. In still another embodiment, a new cycle may commence upon the head station detecting a logic zero busy control field in a packet on outbound path 60. In any event according to the principles of the instant invention, a packet in a cycle would have its start cycle bit set to a logic one by the head station. In general, all other packets in the cycle would have their respective start cycle bit set to a logic zero. Responsive to the detection of a logic one start cycle bit, each station on the loop may set its respective permit register to a logic one for indicating that the station may transmit a packet. As hereinafter described, after a station has transmitted a packet, the station resets its permit register to a logic zero for indicating that the station may not transmit a packet.

Fourthly, each station which has a packet to be transmitted may, responsive to its permit register being set to a logic one, extend a logic one through its write coupler 30-$i$ to path 10 for overwriting the busy bit of the read packet, here illustratively bit 2 of the packet. The overwriting of the busy bit with a logic one may occur whether or not the busy bit being overwritten is already a logic one.

Fifthly, read circuitry of station 70-$i$ includes circuitry for reading the busy bit. Assume that station 70-$i$ has a packet to transmit and that its permit register is set to a logic one. As mentioned, the busy bit is overwritten with a logic one. As is evident from FIG. 1, read coupler 20-$i$ and write coupler 30-$i$ may be a relatively short electrical distance apart. As should also be evident from FIG. 1, some finite time interval may be needed for determining whether or not the packet may be written, e.g., for interpreting the contents, or logic value, of the busy bit of the packet being read. Experimentation has indicated that a relatively few bit time intervals allow adequate time for such a determination. Hence, in the instant embodiments, the dead control field includes a two bit time interval, i.e., the time interval of dead bits 3 and 4 of the read packet, for allowing a time interval during which read circuitry of station 70-$i$ (e.g., decode control 604 of FIG. 6 as later described) may interpret or determine the logic value of the busy bit of the packet being read.

On the one hand, if the contents of the busy bit of the packet being read is a logic zero, the packet to be written may be written through write coupler 30-$i$ onto path 10. For example, the packet writing could include the writing of some (K-4) bits, or in the instant example 153 bits, which comprise a logic zero request bit, a destination address, a source address, data, and a CRC code, as is evident from FIG. 4. As mentioned, the station then resets its permit register to a logic zero for indicating that the station may not transmit a packet.

On the other hand, if the contents of the busy bit of the packet being read is a logic one, the packet to be written is not then written. Instead, responsive to the busy bit of the read packet being a logic one, write circuitry of station 70-$i$ extends a logic one request bit through write coupler 30-$i$ to path 10, here illustratively bit 5 of the packet, for indicating that there is a station on the loop which has a packet to transmit. As aforedescribed for the busy bit, the request bit may itself be overwritten by one or more other stations on the loop. Hence, a logic one request bit is logically interpreted to mean that there is at least one station on the loop which has a packet to transmit. Conversely, a logic zero request bit is logically interpreted to mean that there are no electrically succeeding stations on path 10 which have a packet to transmit.

Thus, in summary, a station may transmit only when its permit register is set to a logic one. After having transmitted a packet, a station sets its permit register to a logic zero. If a station has a packet for transmission and if its permit register is a logic one, the station can overwrite the busy bit with a logic one. In addition, if the busy bit were already a logic one, the station can overwrite the request bit for indicating that a station has a packet for transmission. Thereafter, as packets flow around the loop over path 10 through path 40 onto path 60, the packets are read on the receive side of station 70-$i$ through read coupler 50-$i$.

Figure 5:
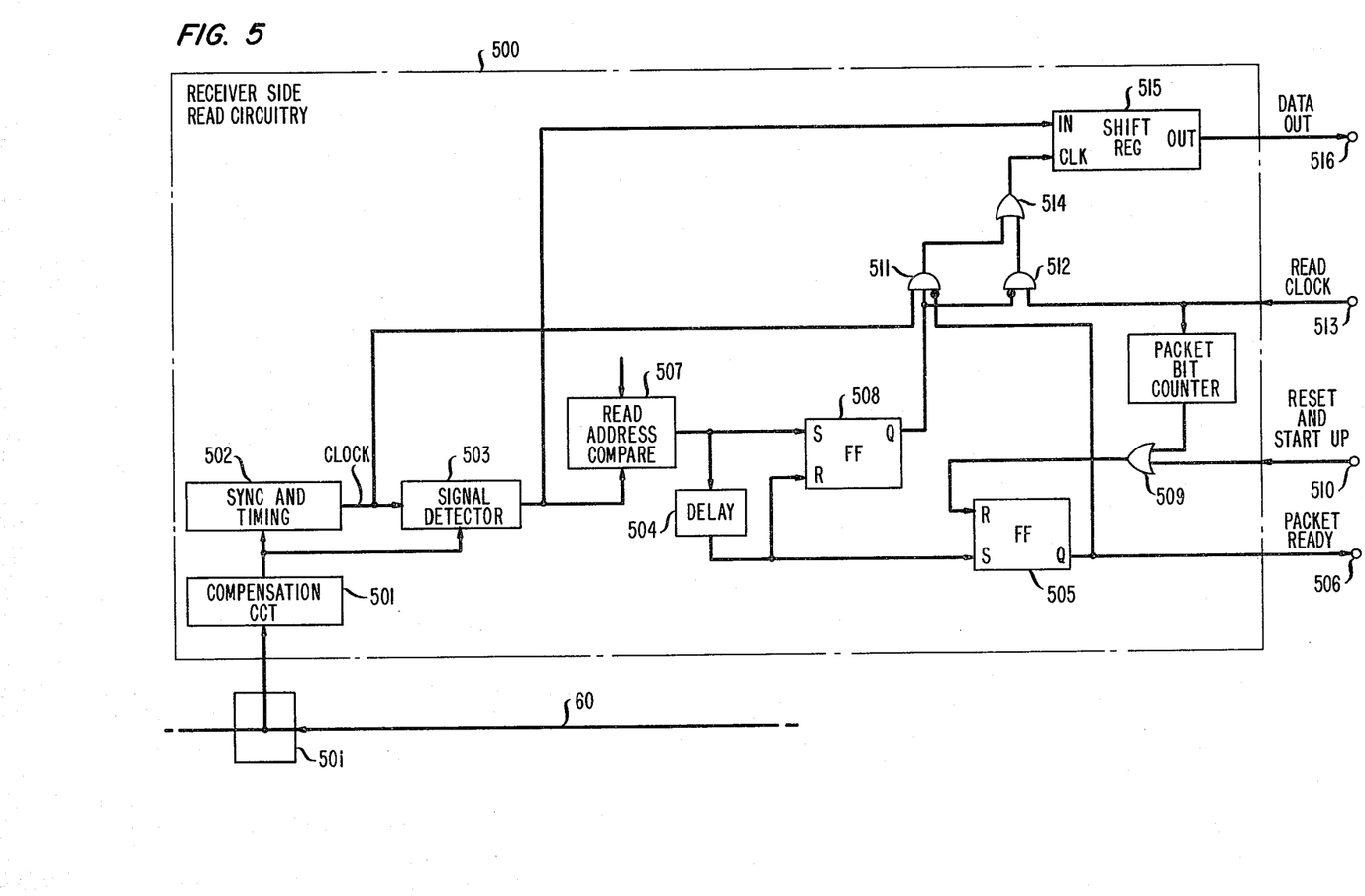
FIG. 5 illustrates receive side circuitry which may be included in each station of FIG. 1 and which is useful in describing the principles of the invention.

Each station 70-$i$ can monitor the loop for packets having, among other things, a destination address identifying the respective station as the addressed station. Upon detection of a destination address for identifying station 70-$i$ as the addressed station, receive side read circuitry in station 70-$i$ can thereafter read the packet and process the packet in whatever manner the station may have been programmed or adapted to do. Illustrative receive side read circuitry is shown in FIG. 5.

According to a second aspect of the instant control protocol for avoiding collisions, called a random mode, a station may transmit a plurality of packets. For example, assume that station 70-$i$ has one or more packets to transmit and that its permit register is set to a logic one. If the busy bit of the packet being read is a logic zero, the write circuitry of station 70-$i$ may overwrite the busy bit with a logic one and proceed, as aforedescribed, to write the packet on path 10 through write coupler 30-$i$. Station 70-$i$ may continue to write packets on path 10 until one of the following conditions is detected:

(a) either station 70-$i$ has no more packets to transmit or
(b) the busy bit of the packet being read is detected as a logic one or
(c) the request bit of the packet being read on the receive side of station 70-$i$ is detected through coupler 50-$i$ to be a logic one.

Responsive to the detection of any of the aforesaid three conditions, stations on the loop may, for example, be adapted to automatically convert to the aforedescribed contention mode.

According to a third aspect of the instant control protocol for avoiding collisions, called a priority mode, one or more predetermined station(s) may each transmit packets during a cycle in such a way as to define a priority among the stations. For example, each predetermined station may include a packet counter in lieu of the aforedescribed permit register. Also, each predetermined station may transmit a respective predetermined number of packets during a cycle, thereby defining a relative priority among the stations during the cycle. More particularly, responsive to the detection of a start of cycle logic one, circuitry in station 70-$i$ may reset a packet counter to a respective predetermined value. The counter may be decremented for each packet transmitted during the cycle. Responsive to the counter being decremented to a zero value, the station may be inhibited from transmitting other packets during the cycle. As an aside, it may be noted that a packet counter value of zero parallels the aforedescribed permit register having a logic zero. Thereby, each predetermined station on the loop may transmit one or more packets during a cycle according to a predetermined priority.

According to a fourth aspect of the instant control protocol for avoiding collisions, called a reverse order mode, a station electrically succeeding another station may reverse a usual order of transmission. Advantageously, the about to be described reverse order mode also allows an increased utilization of the loop. For example, it should be evident from FIG. 1 that, on transmit path 10, station 70-($i$-1) electrically precedes station 70-$i$ and that station 70-$i$ electrically succeeds station 70-(i-1). As a result, a first station, such as station 70-(i-1), which is, on the transmit side, electrically nearer to the head station than is a second station, such as station 70-$i$, can overwrite the busy bit of a packet with a logic one prior to the second station so overwriting the busy bit. Thus, station 70-(i-1) may transmit a packet before station 70-$i$ may transmit its packet. Thereby, a usual transmission order may be established. Conversely, on receive path 60, station 70-$i$ electrically precedes station 70-(i-1) and station 70-(i-1) electrically succeeds station 70-$i$. Accordingly, on the receive side, signals can be coupled to station 70-$i$ prior to those same signals being coupled to station 70-(i-1). As a result, station 70-$i$ may read the request bit of a packet, e.g., bit 5, before the same request bit is read by station 70-(i-1). Thusly, responsive to a logic zero request bit on the receive side and to a logic zero busy bit on the transmit side, station 70-$i$ may transmit a packet before station 70-(i-1) recognizes that it could have transmitted a packet. Thereby, a reversal of the usual transmission order may be established.

In that connection and more particularly, a logic one request bit is logically interpreted to mean that there is at least one station which has a packet to transmit. Conversely, a logic zero request bit, as detected at station 70-$i$ on the receive side of the loop, is logically interpreted to mean that, on the transmit side of the loop, there are no stations which have a packet to transmit. Thusly, on the one hand, responsive to a logic one request bit being extended from path 60 through read coupler 50-$i$ to station 70-$i$, no action need occur at station 70-$i$. This non-action response may obtain because the logical interpretation of a logic one request bit as detected on the receive side of the loop is such that at least one electrically succeeding station on the transmit side of the loop has a packet to transmit, i.e., at least one of stations 70-$j$ where $j=i+1, i+2, \ldots, N$ has a packet to transmit. On the other hand, responsive to a logic zero request bit being extended from path 60 through read coupler 50-$i$ to station 70-$i$, station 70-$i$ may write a packet on path 10 through coupler 30-$i$, if (a) station 70-$i$ has a packet to transmit and if
(b) station 70-$i$ detects a logic zero busy bit in a packet extended thereto through read coupler 20-$i$.

In that sense, station 70-$i$ has electrically reversed the usual transmission order. As the logic zero request bit propagates down path 60 on the receive side, station 70-(i-1) may similarly transmit a packet prior to station 70-(i-2) et cetera. Ultimately the logic zero request bit propagates to station 70-1, the assumed head station. At the head station according to the instant protocol, there is no station 70-$j$, where $j=2, 3, \ldots, N$ which has a packet, that was not transmitted during the cycle. That is, each station had the opportunity to and could transmit its packet(s) during the cycle. Accordingly, the head station may transmit a start cycle packet for initiating a new cycle, i.e., transmit a packet including a logic one start cycle control bit.

As an aside, if the start cycle packet flows around the loop and is detected at the receive side of the head station with a logic zero request bit, it is clear that there is either none or exactly one station transmitting a packet. Responsive thereto, the system may transfer from, for example, the contention mode to the random mode of operation.

As priorly described, station 70-$i$ includes transmit side read circuitry and write circuitry for coupling signals from and to path 10 by way of read coupler 20-$i$ and 30-$i$, respectively. Also as priorly described, station 70-$i$ includes receive side read circuitry for coupling signals from path 60 by way of read coupler 50-$i$. The foregoing description of the functions of the system and station 70-$i$, when coupled with the about to be described receive side read circuitry 500 of FIG. 5 and transmit side read/write circuitry 600 of FIG. 6, offers sufficient detail for understanding an illustrative embodiment of the instant protocol. For brevity, the following description omits the just described reverse order mode and, more particularly, describes one illustrative embodiment of packet reading apparatus.

Specifically, referring to FIG. 5, receive side read circuitry 500 is initialized by station terminal equipment such as a digital computer (not shown) extending a logic one reset signal through terminal 510 to a first input of OR gate 509 for resetting flip-flop 505 and for initializing circuitry 500. Responsive to being reset, flip-flop 505 extends a logic zero reset signal from its Q output jointly to a first inverting input of AND gate 511 and to packet ready terminal 506 for signaling the terminal equipment to ignore signals at data out terminal 516. Signals from receive side path 60 are extended through read coupler 50-i and thence through compensation circuit 501 for compensating the electrical length of the loop. Circuit 501 may include common amplifier(s), automatic gain control, automatic filtering, and signal shaping circuits. The compensated signals are jointly extended to respective inputs of synchronizing and timing circuit 502 and signal detector 503. As signals are extended through signal detector 503, the signals being of a format illustrated in FIG. 4, read address comparator 507 monitors the destination address field looking for the address of station 70-i and usually extends a logic zero output signal to the set input of flip-flop 508. Upon detection of the destination address being the address of station 70-i, a logic one is extended from an output of comparator 507 jointly to the set input of flip-flop 508 and to an input of delay circuit 504, circuit 504 for introducing a delay equaling the time for receiving the number of bits comprising the source address, data and CRC code fields, e.g., here 144 bits. Responsive to the logic one output of comparator 507, flip-flop 508 extends a logic one from its Q output jointly to a first inverting input of AND gate 512 and a second input of AND gate 511. Synchronizing and timing circuit 502 extends a clock signal jointly to signal detector 503 and to a third input of AND gate 511. Responsive to the clock signal, signal detector 503 extends digital signal bits from path 60 which bits comprise the packet being received jointly to an input of comparator 507 as priorly mentioned and to an input of shift register 515. The digital bits of the packet comprise the source address field, data field and CRC code field and are shifted into shift register 515 at a loop clock rate of about 100 megabits per second, that clock rate signal being extended as an output of AND gate 511 through a first input of OR gate 514 for clocking signals into shift register 515. As mentioned, delay circuit 504 introduces a delay to the logic one comparator 507 output, the delay equaling the number of bits comprising the source address, data and CRC code fields. At the expiration of the delay and when the packet has been read into shift register 515, a logic one reset signal is extended from an output of delay circuit 504 jointly to a set input of flip-flop 505 and to a reset input of flip-flop 508. Responsive thereto, the output of flip-flop 505 is set to a logic one which is extended jointly to packet ready terminal 506 and to the first inverting input of AND gate 511. Also responsive to the output of delay circuit 504, the output of flip-flop 508 is reset to a logic zero for inhibiting the extension of clock signals from synchronizing and timing circuit 502 through AND gate 511 and OR gate 514 to shift register 515 as well as for enabling, by way of the first inverting input of AND gate 512, the extension of data terminal 513 clock signals through a second input of AND gate 512 to a second input of OR gate 514. Thereafter, responsive to clock signals at terminal 513, the digital signals may be read from shift register 515 and extended to data output terminal 516 for processing by the station terminal equipment. It may be noted that the clock signals at terminal 516 may be slower, faster or at the same rate as those clock signals from synchronizing and timing circuit 502. That is, the data terminal may, for example, operate at a slower bit rate than the communications loop.

Referring to FIG. 6, transmit side read/write circuitry is initialized by station terminal equipment such as a digital computer (not shown) extending a logic one reset signal through terminal 613 to a first input of OR gate 609 for resetting jointly permit register flip-flop 608, packet ready flip-flop 625, and flip-flop 617 as well as for setting flip-flop 623. Responsive to being reset, flip-flop 608 extends a logic zero reset signal from its Q output jointly to respective first inputs of AND gate 605 and 611. Signals are read from transmit side path 10 through read coupler 20-i and thence through compensation circuit 601 which compensates the electrical length of the loop. Circuit 601 may include common amplifier(s), automatic gain control, automatic filtering, and signal shaping circuits. The compensated signals are extended jointly to synchronizing and timing circuit 602 and to signal detector 603. As signals are extended through signal detector 603, the signals being of a format illustrated in FIG. 4, decode control 604 monitors the protocol control bits of the packet. Responsive to a start packet signal from circuit 602 for indicating bit and data synchronization, e.g., a sync burst having been detected, decode control 604 extends the start cycle bit of the read packet to the set input of permit register flip-flop 608. Responsive to a logic one start cycle bit, permit register 608 sets the permit register Q output to a logic one for indicating that station 70-i may transmit a packet.

The manner in which circuitry 600 is loaded with a packet to be transmitted will be described shortly. For now, assume packet ready flip-flop 625 has been set. Hence, packet ready flip-flop 625 may extend a logic one Q output signal for indicating that the station has a packet to be transmitted jointly to a first input of AND gate 614, to a second input of AND gate 605, to a first input of AND gate 606, and to a first inverting input of AND gate 622. Synchronizing and timing circuit 602 extends a logic one busy clock pulse during the time interval of the busy bit of the read packet and otherwise extends a logic zero signal to a third input of AND gate 605. The coincidence of the station having a packet to transmit (i.e., output of flip-flop 625 being a logic one), the permit register (i.e., the output of flip-flop 608) being a logic one and the busy clock pulse of the packet being read results in the extending of a logic one from an output of AND gate 605 through OR gate 612, cable drive circuitry 607 and write coupler 30-i onto the communications loop, thereby, overwriting the busy bit with a logic one whether or not the busy bit being overwritten was already a logic one.

During the dead control field time interval represented by bits 3 and 4 of the read packet, decode control 604 determines the logic value of the busy bit of the packet being read. Decode control 604 extends the read busy bit jointly to a second input of AND gate 606 and through an inverting second input of AND gate 611. If the busy bit of the packet being read is a logic one, the packet to be written is not written on path 10. Instead, synchronizing and timing circuit 602 extends a logic one request clock pulse during the time interval of the request bit of the read packet otherwise extends a logic zero to a third input of AND gate 606. The coincidence of the station having a packet to transmit (i.e., output of flip-flop 625 being a logic one), the busy bit of the read packet being a logic one and the request clock pulse of the packet being read results in the extending of a logic one from an output of AND gate 606 through OR gate 612 thence through cable driver 607 and write coupler 30-i to path 10 for overwriting the request bit with a logic one thereby indicating that there is a station on the loop which has a packet to transmit. Here, bit 5 of the read packet includes the request bit.

Nextly, the loading of circuitry 600 with a packet to be transmitted is described, to be followed by a description of the unloading of circuitry 600 and the writing of the packet on the communications loop.

As to loading circuitry 600, as mentioned, the Q output of flip-flop 625 is reset to a logic zero reset signal responsive to a reset signal at terminal 613. A logic zero Q output of flip-flop 625 is extended through a first inverting input of AND gate 622. Thereafter, responsive to a logic one clock signal at terminal 627, which clock signals are extended jointly to an input of packet bit counter 626 and to a second input of AND gate 622, clock signals are extended through a first input of OR gate 620 to a clock input of shift register 618. Responsive to the clock signals, a packet is extended from input terminal 619 and read into shift register 618. Packet bit counter 626 is for counting the number of bits in a packet. Upon detection of a predetermined number of bits, a logic one is extended from an output of packet counter 626 jointly to a set input of flip-flop 625 and to a reset input of flip-flop 623. Upon being set, flip-flop 625 extends a logic one to the first inverting input of AND gate 622 for inhibiting the clock signals and for terminating the loading of shift register 618. Thereby, a packet to be transmitted is loaded into circuitry 600.

As to unloading a packet from circuitry 600 and writing same on the communications loop, decode control 604 extends the read busy bit to the second inverting input of AND gate 611. As priorly described, a logic zero busy bit indicates a packet may be written. Accordingly, responsive to a logic one from permit register 608 and to a logic zero busy bit, AND gate 611 extends a logic one to the set input of flip-flop 617 and to an input of delay circuit 610. Upon being set, flip-flop 617 extends a logic one set signal from its Q output to a first input of AND gate 621. Packet clock timing signals consistent with the bit rate on the communications loop are extended from timing circuit 602 to a second input of AND gate 621 and therethrough to a second input of OR gate 620 for clocking signals from shift register 618 through a first input of OR gate 616, a second input of AND gate 614, of OR gate 612, and write coupler 30-i onto the communications loop.

Noting the packet format, as illustrated in FIG. 4, the packet clock timing signals are extended through the second input of AND gate 621. In order to insert the source address and realizing that the source address of station 70-i is typically the identical bit pattern for each packet transmitted by station 70-i, a source address insert signal is extended from timing circuit 602 for enabling read only memory (ROM) 615 to extend the source address signal from ROM 615 through a second input of OR gate 616, second input of AND gate 614, OR gate 612, cable driver 605, cable driver 607, and write coupler 30-i onto the communications loop. While ROM 615 is thusly enabled, timing circuit 602 extends logic zero packet clock signals to the second input of AND gate 621 and OR gate 620 for inhibiting the reading of shift register 618. Delay circuit 610 delays its logic one input for a time interval corresponding to the number of bits in a packet to be transmitted and thereafter extends the logic one to a second input of OR gate 609 for resetting the output of permit register 608 to a logic zero, thereby terminating packet transmission.

Although the invention has been described and illustrated in detail, it is to be understood that same is by way of illustration and example only. For brevity, some alternative modifications of the principles of the invention have been disclosed. Still other modifications of the principles of the invention will occur to those skilled in the art. Accordingly, the invention is not to be considered limited by the embodiment(s) shown and thus the spirit and scope of the invention are limited only by the appended claims.

What is claimed is:

1. A method for controlling digital signals in a communications system, said system including a communications loop, a plurality of stations, at least two of said stations being respectively coupled to a first and a second signal path of said loop, said method including the steps of writing a first packet signal on said first path and reading a second packet signal from said second path and characterized in that said method further comprising the steps of reading a third packet signal from said first path and avoiding a collision on said communications loop in response to said third packet.

2. The method defined in claim 1 wherein said collision avoiding step further comprises the step of overwriting a busy control field of a third packet on said first path with a signal for indicating that a station has a first packet to transmit on said first path.

3. The method defined in claim 2 wherein said collision avoiding step further comprises the steps of reading a busy control field of said third packet, said third packet busy control field having been read prior to its having been overwritten, and responsive to said priorly read busy control field indicating that said first path is not busy and responsive to said station having said first packet to transmit, writing said first packet on said first path, said first packet thereby overwriting said third packet on said first path.

4. The method defined in claim 2 wherein said collision avoiding step further comprises the steps of reading a busy control field of said third packet, said third packet busy control field having been read prior to its having been overwritten, and responsive to said priorly read busy control field indicating that said first path is busy, writing a request control field in said thrid packet on said first path for indicating that a station has a packet to transmit but that said station could not transmit the packet because said first path is busy.

5. The method defined in claim 2 wherein said collision avoiding step further comprising the steps of:

reading a busy control field of said third packet, said third packet busy control field having been read prior to its having been overwritten, reading a request control field of a second packet on said second path, and responsive to said priorly read busy control field indicating that said first path is not busy and responsive to said second packet request control field indicating that no station on said loop was unable to transmit a packet, writing said first packet on said first path, said first packet thereby overwriting said third packet on said first path.

6. The method defined in claim 2 wherein said collision avoiding step further comprises the steps of reading a request control field of a second packet on said second path and responsive to said second packet request control field indicating that no station on said loop was unable to transmit a packet, initiating a start cycle packet on said loop, said start cycle packet being transmitted by a head station on said first path and said start cycle packet including a start cycle field responsive to which a station on the loop may be initialized to transmit a packet.

7. The method defined in claim 1 wherein said collision avoiding step further comprises the steps of:

reading a busy control field of a second packet on said second path, and responsive to said second packet busy control field indicating that said first path is not busy, initiating a start cycle packet on said loop, said start cycle packet being transmitted by a head station on said first path and said start cycle packet including a start cycle field responsive to which a station on the loop may be initialized to transmit a packet.

8. A communications system comprising a communications loop, said loop including a first and a second signal path, said signal paths being oppositely directed, a plurality of stations, each of at least two of said stations being coupled to both said first and said second signal paths, a station including means for writing a first packet signal on said first path and means for reading a second packet signal from said second path and characterized in that said system further comprises:

means for reading a third packet signal from said first path, means for said first path reading means to be coupled to said first path in a manner electrically preceding said first path writing means, and means responsive to said first, second and third packet signals for avoiding collisions on said communications loop.

9. The system defined in claim 8 wherein each of said first, second and third signals includes a predetermined packet format, said packet format including a packet field and a plurality of control fields and wherein said collision avoiding means further comprises:

means for reading the contents of said control fields of said second and third signals and means for writing the contents of said control fields of said first signal onto said first path, said first signal overwriting predetermined field(s) of said third signal whereby said overwritten third signal may be extended along said first path to said second path as said second signal.

10. The system defined in claim 8 wherein said collision avoiding means further comprises:

means for writing first contents in a busy control field of said third signal, said first contents for indicating that said station has a packet to transmit, and means for overwriting said third signal with said first signal.

11. The system defined in claim 10 wherein said collision avoiding means further comprises:

means responsive to second contents of said busy control field of said third signal for writing a packet on said first path, said second contents for indicating that said first path is not busy.

12. The system defined in claim 10 wherein said collision avoiding means further comprises:

means for reading contents of a busy control field of said third signal, said third signal busy control field having been read prior to its having been overwritten with said first contents, means for reading contents of a request control field of said second signal, and means, responsive to said priorly read third signal busy control field indicating that said first path is not busy and responsive to said second signal packet request control field indicating that no station on said loop was unable to transmit a packet, for writing said first signal on said first path, said first signal thereby overwriting said third signal on said first path.

13. The system defined in claim 8 wherein said collision avoiding means further comprises:

means responsive to contents of a busy control field of said third signal for writing a packet on said first path, said contents for indicating that said first path is not busy.

14. The system defined in claim 8 wherein said collision avoiding means further comprises:

means responsive to first contents of a busy control field of said third signal for writing second contents in a request control field of said first signal, said first signal thereby overwriting a request control field of said third signal with said second contents, said first contents for indicating that said first path is busy and said second contents for indicating that said station has a packet to transmit.

15. The system defined in claim 8 wherein said collision avoiding means further comprises:

means responsive to contents of a request control field of said second signal for initiating a start cycle packet on said first path, said contents for indicating that no station on said first path was unable to transmit a packet and said start cycle packet being transmitted by a head station on said first path and said start cycle packet including a start cycle field responsive to which a station on said loop may be initialized and permitted to transmit a packet.

16. The system defined in claim 8 wherein said collision avoiding means further comprises:

means for reading contents of a busy control field of said second signal, and means responsive to said second signal busy control field indicating that said first path is not busy for initiating a start cycle packet on said loop, said start cycle packet being transmitted by a head station on said first path and said start cycle packet including a start cycle field responsive to which a station on the loop may be initialized to transmit a packet.

17. Station apparatus for controlling digital signals, said station adapted to be coupled to a communications loop, said loop including a first and a second signal path, said signal paths being oppositely directed, said station including means for writing a first packet signal on said first path and means for reading a second packet signal from said second path and characterized in that said station further comprises:
- means for reading a third packet signal from said first path,
- means for said first path reading means to be coupled to said first path in a manner electrically preceding said first path writing means, and
- means responsive to said first, second and third packet signals for avoiding collisions on said communications loop.

18. The station defined in claim 17 wherein
each of said first, second and third signals includes a predetermined packet format, said packet format including a packet field and a plurality of control fields and wherein
said collision avoiding means further comprises:
- means for reading the contents of said control fields of said second and third signals and
- means for writing the contents of said control fields of said first signal onto said first path, said first signal overwriting predetermined field(s) of said third signal
- whereby said overwritten third signal may be extended along said first path to said second path as said second signal.

19. The station defined in claim 17 wherein said collision avoiding means further comprises:
- means for writing first contents in a busy control field of said third signal, said first contents for indicating that said station has a packet to transmit, and
- means for overwriting said third signal with said first signal.

20. The station defined in claim 19 wherein said collision avoiding means further comprises:
- means responsive to second contents of said busy control field of said third signal for writing a packet on said first path, said second contents for indicating that said first path is not busy.

21. The station defined in claim 19 wherein said collision avoiding means further comprises:
- means for reading contents of a busy control field of said third signal, said third signal busy control field having been read prior to its having been overwritten with said first contents,
- means for reading contents of a request control field of said second signal, and
- means, responsive to said priorly read third signal busy control field indicating that said first path is not busy and responsive to said second signal packet request control field indicating that no station on said loop was unable to transmit a packet, for writing said first signal on said first path, said first signal thereby overwriting said third signal on said first path.

22. The station defined in claim 17 wherein said collision avoiding means further comprises:
- means responsive to contents of a busy control field of said third signal for writing a packet on said first path, said contents for indicating that said first path is not busy.

23. The station defined in claim 17 wherein said collision avoiding means further comprises:
- means responsive to first contents of a busy control field of said third signal for writing second contents in a request control field of said first signal, said first signal thereby overwriting a request control field of said third signal with said second contents, said first contents for indicating that said first path is busy and said second contents for indicating that said station has a packet to transmit.

24. The station defined in claim 17 wherein said collision avoiding means further comprises:
- means responsive to contents of a request control field of said second signal for initiating a start cycle packet on said first path, said contents for indicating that no station on said first path was unable to transmit a packet and said start cycle packet being transmitted by a head station on said first path and said start cycle packet including a start cycle field responsive to which station on said loop may be initialized and permitted to transmit a packet.

25. The station defined in claim 17 wherein said collision avoiding means further comprises:
- means for reading a busy control field of said second signal, and
- means responsive to said second signal busy control field indicating that said first path is not busy for initiating a start cycle packet on said loop, said start cycle packet being transmitted by a head station on said first path and said start cycle packet including a start cycle field responsive to which a station on the loop may be initialized to transmit a packet.

* * * * *